July 22, 1941.    G. H. CAMPION    2,250,007
BRAKING DEVICE
Filed Dec. 29, 1939
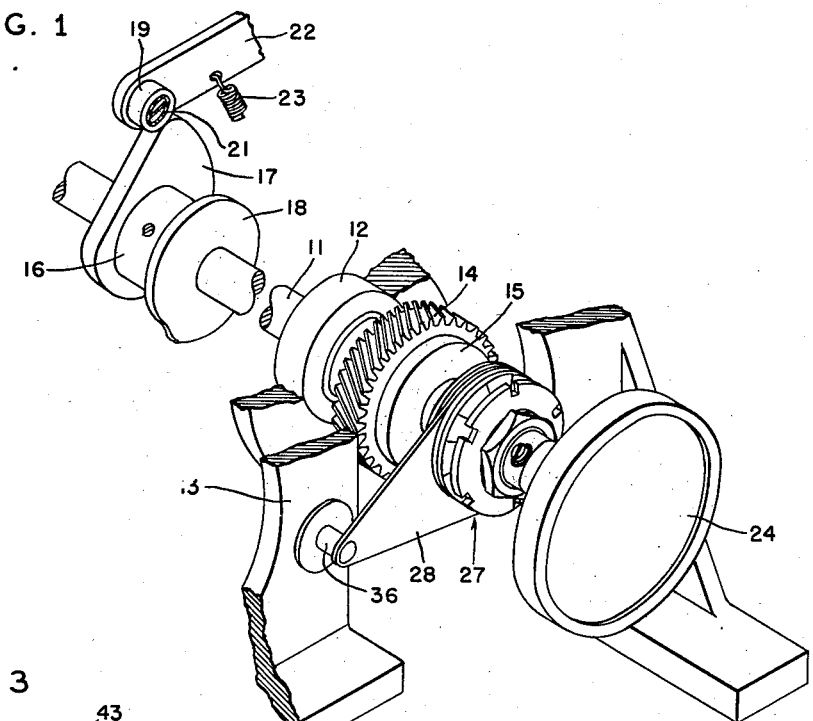
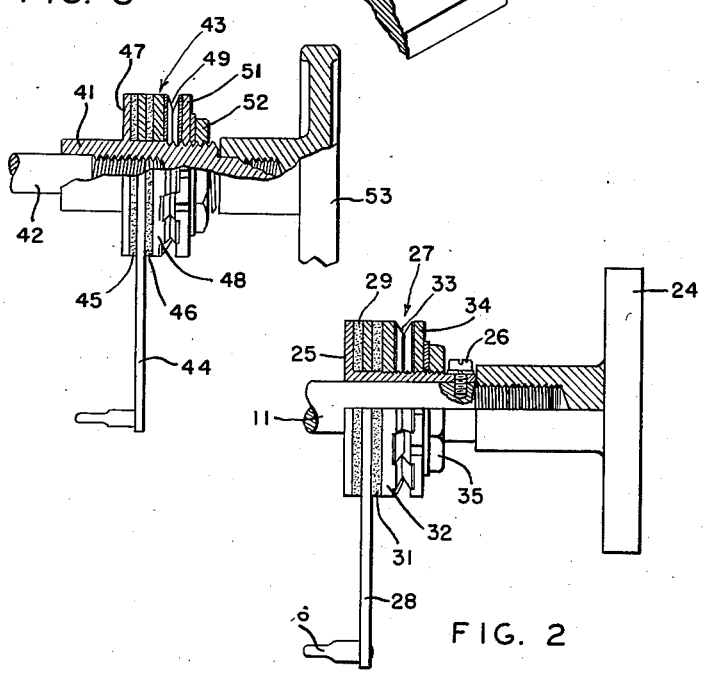
INVENTOR.
GEORGE H. CAMPION
BY *H. B. Whitfield*
ATTORNEY.

Patented July 22, 1941

2,250,007

UNITED STATES PATENT OFFICE 2,250,007

BRAKING DEVICE

George H. Campion, Chicago, Ill., assignor to Teletype Corporation, Chicago, Ill., a corporation of Delaware Application December 29, 1939, Serial No. 311,505

2 Claims. (Cl. 188—83)

The present invention pertains to braking devices and more particularly to frictional brake means for maintaining a rotatable shaft in adjusted angular position.

The principal object of the invention is to provide a friction brake means to prevent rotational movement of a cam shaft due to the pressure of its cam followers, whereby the shaft may be adjustably positioned angularly.

Specifically, in effecting adjustments in mechanical apparatus; for example, printing telegraph machines, it is often desirable to operate the mechanisms embodied therein slowly by hand to determine the proper relationships between the component parts; that is, it is necessary at times to effect adjustments which require that the cam shaft be rotated manually, and in so doing, the shaft must be held in specified or predetermined positions while clearances and spring tensions are being checked.

In connection with printing telegraph apparatus, it is desirable at times to make certain adjustments in the field, and to aid in this procedure, adjustment bulletins are distributed to users of the equipment to facilitate the performance of the work in the field, and to expedite the making of such adjustments, a friction brake means according to the present invention is provided which permits the main shaft to be rotated to the desired angular position for the desired adjustments, for example, of the printing cam and function cams and the bails, levers, and springs therefor, of the main shaft clutch spring, and of the spring mechanism.

The above and other objects of the invention will be clearly set forth in the following description when taken in conjunction with the accompanying drawing, wherein Fig. 1 is a perspective view of an operating cam shaft embodying the present invention;

Fig. 2 is a longitudinal view, partly in section of one form of friction brake means according to the invention; and Fig. 3 is a similar view of another form of the device according to the present invention.

Having reference to Fig. 1, a shaft 11 is journaled at each end (only one end being shown) in an antifriction bearing 12 which is carried in the frame 13. Mounted freely on shaft 11 is a gear 14, which is driven, in well-known manner, by a driving pinion of a motor (not shown). Gear 14 is adapted to drive the shaft 11 through a friction clutch 15. A cam sleeve 16 is fixed to shaft 11 and is provided with cams 17 and 18. Associated with cam 17 is a cam follower roller 19 carried by means of an antifriction bearing on a stud 21 secured to the extremity of a lever arm 22. Arm 22 is provided with a biasing spring 23, which acts to hold roller 19 constantly in engagement with the periphery of cam 17.

As previously mentioned, to effect adjustments, shaft 11 is manually rotated, and for this purpose a hand wheel 24 is affixed to the end of the shaft. With cam 17 substantially in the position shown in Fig. 1, but without the aid of the present invention, arm 22 under the influence of spring 23 and through roller 21 will act to urge cam 17, and hence cam sleeve 16 and shaft 11, clockwise (as viewed in Fig. 1). Similarly, when the roller 21 bears against the periphery of cam 17 adjacent the apex thereof, but on the side opposite to that shown in Fig. 1, the cam follower arm 22 under the influence of spring 23 will rotate cam sleeve 16 counterclockwise. Under similar conditions, cam 18 is acted upon by its cam follower (not shown) in the same manner.

With the use of roller bearing or other antifriction cam follower rollers the frictional load on the main cam shaft is reduced considerably so that the shaft will not remain in any given position but rotates so that the cam followers rest on the low parts of the cams. To overcome this objection, the main shaft hand wheel arrangement according to the present invention is provided. Referring to Fig. 2, the hand wheel 24 is threaded onto the end of the shaft 11, and adjacent to the hub of the hand wheel is located a flanged sleeve member 25, which is secured to the shaft 11 by a screw 26. Mounted on sleeve member 25 is a friction clutch 27, embodying a nonrotatable member 28. A friction member 29 (for example, a felt annular pad) is placed between the member 28 and the flange of sleeve member 25. A similar friction member 31 is positioned between member 28 and an annular disc member 32 freely mounted on member 25. The member 32 is engaged by a slit annular spring 33 which also presses against a disc 34 in threaded engagement with the tubular end of sleeve member 25 and held in position by means of a lock nut 35, the tension of the spring 33 and hence the pressure of the friction clutch, is regulated by the disc 34 and its lock nut 35.

Fixed adjacent the end of member 28 is a stud member 36 which is adapted to fit into a hole in the frame 13 by means of which plate 28 is anchored thereto (Fig. 1) to prevent rotation of the member 28 by the friction clutch 27. In this manner, the friction between felt washers 29 and 31 and member 28 serves to hold shaft 11 against rotative movement due to the pressure of roller 21 on the periphery of cam 17. The resistance offered by the friction clutch 27 to the pressure exerted by spring 23 can be readily balanced or adjusted by disc 34 and spring 33. This felt washer type of friction brake with its plate 28 held securely against rotative movement facilitates the rotation of the shaft 11 by hand, through the instrumentality of hand wheel 24 in effecting adjustments, but holds the shaft stationary when the hand is removed from the hand wheel.

A modified form of the invention is shown in Fig. 3 and comprises a member 41 (analogous to sleeve member 25 of Fig. 2) which is threaded to the end of a shaft 42 comparable to shaft 11. Mounted on member 41 is a friction clutch indicated generally as 43 (and similar in construction to friction clutch 27 in Fig. 2), embodying a nonrotatable member 44, similar to member 28. As in clutch 27, a pair of friction members 45 and 46 are juxtapositioned to member 44; friction member 45 being disposed between member 44 and a flange 47 on member 41, and friction member 46 being located between member 44 and an annular disc member 48 freely mounted on member 41. The member 48 is engaged by a slit annular spring 49 which also presses against a disc 51 in threaded engagement with the right-hand end of member 41 and held in position by means of a lock nut 52. The tension of the spring 49, and hence the pressure of the friction clutch, is regulated by the disc 51 and its lock nut 52. A hand wheel 53 is threaded onto the end of member 41, instead of directly to the shaft, as in the arrangement shown in Fig. 2.

A feature of the invention, as exemplified by the forms disclosed in Figs. 2 and 3, resides in the unitary construction of the friction brake means; that is, the brake means shown in Figs. 2 and 3 are constructed as a unit so that they can be readily connected to the main shaft and anchored to the frame. More specifically, in Fig. 2, the sleeve 25 carries as a unit the friction brake means 27 and may be slid onto shaft 11 and secured thereto in the appropriate position by the screw 26. Similarly, the member 41 carries the friction brake means 43 as a unit which is threaded onto shaft 42 and thus appropriately positioned.

The principles disclosed herein may include many other adaptations and accordingly the invention is not limited by the illustrations chosen to describe the invention.

What is claimed is:

1. In a machine, a shaft, cam means carried on said shaft, spring loaded follower means to exert pressure on said cam means, whereby said shaft is subjected to a torque, a friction brake means removably fixed to said shaft comprising in a unitary structure a flanged member securable to said shaft, an independently anchorable friction plate freely carried by said flanged member in co-operative relation with the flange thereof, a pair of discs of friction material juxtapositioned to said friction plate and carried on said flanged member, one of said discs positioned between said friction plate and said flange, the other of said discs positioned between said friction plate and an annular member also carried on said flanged member, a radially slit annular spring member having its adjacent segmental portions oppositely deflected, said spring member yieldingly disposed between said annular member and a second annular member having threaded engagement with said flanged member for adjustable relation therewith to control through said spring member the compression of said friction discs, an element also having threaded engagement with said flanged member in co-operative relation with said second annular member to lock said friction brake in adjusted position, and means for anchoring said friction plate to the machine to prevent, through the instrumentality of said brake means, rotational movement of said shaft by said follower means.

2. In a machine, a shaft, cam means carried on said shaft, spring loaded follower means adapted to exert pressure on said cam means, whereby said shaft is subjected to a torque, a friction brake means removably fixed to said shaft comprising in a unitary structure a flanged member securable to said shaft, an independently anchorable friction plate freely carried by said flanged member in co-operative relation with the flange thereof, a pair of discs of friction material juxtapositioned to said friction plate and carried on said flanged member, one of said discs positioned between said friction plate and said flange, the other of said discs positioned between said friction plate and an annular member also carried on said flanged member, a radially slit annular spring member having its adjacent segmental portions oppositely deflected, said spring member yieldingly disposed between said annular member and a second annular member having threaded engagement with said flanged member for adjustable relation therewith to control through said spring member the compression of said friction discs, an element also having threaded engagement with said flanged member in co-operative relation with said second annular member to lock said friction brake in adjusted position, means for anchoring said friction plate to the machine to prevent, through the instrumentality of said brake means, rotational movement of said shaft by said follower means, and means also carried by said flanged member whereby said shaft may be adjustably positioned angularly.

GEORGE H. CAMPION.